(12) United States Patent
Toben et al.

(10) Patent No.: US 7,805,833 B2
(45) Date of Patent: Oct. 5, 2010

(54) DUCT REINFORCEMENT ROD AND FABRICATION APPARATUS

(75) Inventors: John J. Toben, Cedar Rapids, IA (US); Michael C. Borwig, Swisher, IA (US)

(73) Assignee: Met-Coil Systems, LLC, Westfield, MA (US)

( * ) Notice: Subject to any disclaimer, the term of this patent is extended or adjusted under 35 U.S.C. 154(b) by 1306 days.

(21) Appl. No.: 10/668,704

(22) Filed: Sep. 23, 2003

(65) Prior Publication Data

US 2005/0039812 A1   Feb. 24, 2005

Related U.S. Application Data

(60) Provisional application No. 60/412,722, filed on Sep. 23, 2002.

(51) Int. Cl.
*B23P 11/00* (2006.01)
(52) U.S. Cl. .............................. 29/819; 29/516; 29/822; 254/30
(58) Field of Classification Search .................. 29/516, 29/788, 818, 512, 822, 819; 411/546, 176; 254/30

See application file for complete search history.

(56) References Cited

U.S. PATENT DOCUMENTS

| | | | | |
|---|---|---|---|---|
| 328,213 A | * | 10/1885 | Griscom | 254/30 |
| 812,131 A | * | 2/1906 | Hoekstra | 254/30 |
| 1,272,634 A | * | 7/1918 | De Escobales | 470/53 |
| 1,640,458 A | * | 8/1927 | Ledig et al. | 254/1 |
| 3,376,933 A | * | 4/1968 | Burlett | 254/30 |
| 3,501,828 A | * | 3/1970 | Schultz | 29/896.7 |
| 3,590,464 A | * | 7/1971 | Wildi et al. | 29/419.2 |
| 4,005,519 A | * | 2/1977 | Di Maio et al. | 29/818 |
| 4,121,745 A | * | 10/1978 | Smith et al. | 227/8 |
| 5,339,516 A | * | 8/1994 | Ishikawa et al. | 29/705 |
| 5,779,623 A | * | 7/1998 | Bonnell | 600/114 |
| 5,909,863 A | * | 6/1999 | Mansfield et al. | 248/235 |
| 5,934,537 A | * | 8/1999 | Miller | 226/182 |
| 6,116,833 A | | 9/2000 | Ellis | |
| 6,901,969 B2 | * | 6/2005 | Siiter | 138/172 |

\* cited by examiner

*Primary Examiner*—Flemming Saether
(74) *Attorney, Agent, or Firm*—McCormick, Paulding & Huber LLP (57) ABSTRACT

A duct reinforcing rod and fabrication apparatus for use with a conduit and a threaded element dimensioned to fit within the conduit includes a positioning device to position the conduit at an insertion position and an insertion device for inserting the threaded element a predetermined distance into the conduit. A deformation device is also employed to deform the conduit such that the deformation occurs at two locations on the conduit, the two locations being longitudinally spaced from one another along a length of the conduit.

1 Claim, 10 Drawing Sheets

DUCT REINFORCEMENT ROD AND FABRICATION APPARATUS

CROSS REFERENCE TO RELATED APPLICATIONS

This application claims the benefit of U.S. Provisional Application Ser. No. 60/412,722, filed on Sep. 23, 2002, herein incorporated by reference in its entirety.

FIELD OF THE INVENTION

This invention relates in general to a duct reinforcement rod and fabrication apparatus, and deals more particularly with a duct reinforcement rod and fabrication apparatus which increases the structural stability of ductwork while reducing fabrication time and component expense.

BACKGROUND OF THE INVENTION

Ductwork is utilized to facilitate the heating, ventilation and cooling of various buildings, both residential and commercial. The ductwork typically comprises individual duct sections which are then coupled together to form a continuous, largely airtight duct for conveying a moving mass of air.

The duct sections are typically made from strong, yet relatively light, material such as sheet metal, or the like. It is an important design characteristic that the duct remain as lightweight as possible in order to minimize the size and weight of fasteners and other structural components required to support the ductwork, as well as maintaining materials and fabrication costs of the ductwork itself at reasonable costs.

Commonly utilized ductwork often have rectangular, circular or oval cross sections, and are frequently manufactured and supplied in pre-cut lengths or sections with transversely outwardly protruding interconnection flanges, provided at opposite longitudinal ends of the section, to facilitate interconnecting duct sections at a job site and thus form the finished air conveying ducts of desired lengths.

Whatever the size or shape of the ductwork, the relatively small thickness of the walls of the ductwork, as compared to its cross-sectional dimensions, results in the duct walls being rather flexible. Conventional ductwork may therefore experience large, possibly destructive and oftentimes loud structural deformations if static or dynamic air pressure differentials between the interior and the exterior of the ductwork exceeds a predetermined threshold value. For this reason, mechanical engineering standards, as well as most building codes, require that certain ductwork be reinforced against expansion and/or collapse.

Figure 1:
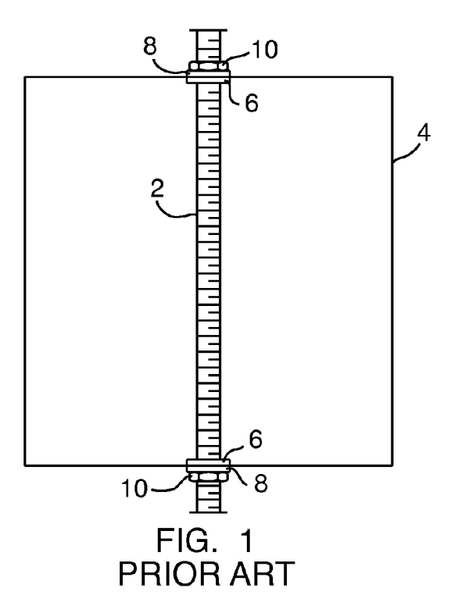
FIG. 1 illustrates one known reinforcement mechanism for ductworks.

One known reinforcement mechanism for ductworks is shown in FIG. 1 and includes a threaded tie rod 2 oriented between opposite planar sides of a rectangular duct 4. Fixed, inner washers 6 are disposed adjacent the interior side of the opposing duct walls 4, while exterior washers 8 are disposed on the exterior of the duct walls 4 in matching relation to one another. As shown in FIG. 1, a threaded nut 10 is screwed down against each of the exterior washers 8 to secure the reinforcing tie rod in position.

There are several variations of the reinforcing mechanism shown in FIG. 1 and these variations may also include rubber o-rings or other elastic sealing devices disposed between the washers and the duct walls. Moreover, it is also known to replace the fixed, inner washers 6 with threaded nuts or lock nuts which may then be tightened in association with the tightening of the exterior threaded nuts 10 to provide the necessary rigidity to the reinforcing mechanism.

Figure 2:
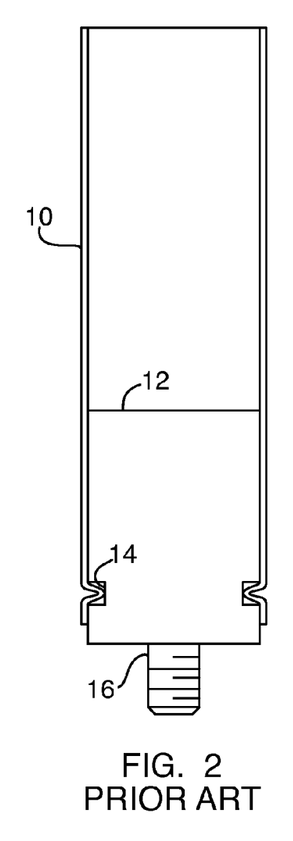
FIG. 2 is a cross-sectional view of another known reinforcement mechanism for ductworks.

FIG. 2 illustrates a cross-sectional view of another known reinforcing mechanism which is comprised of a metallic tube 10 and an insert 12. After the insert 12 has been disposed within the tube 10, the tube 10 is crimped so as to deform in a radially inward direction. The crimped section of the tube 10 becomes locked within an annular groove 14 which has been inscribed about the periphery of the insert 12, thus locking the insert 12 within the tube 10. A threaded bolt 14 extends from the insert 12 and would extend beyond the exterior of a duct wall to be secured thereto via a threaded nut, or the like. The insert 10 may also include an inner cavity to accommodate an unillustrated biasing member, such as a spring, wherein the spring would outwardly bias the bolt 16 for greater flexibility. The insert 12 may be made from a metallic material or from a plastic or polymer material.

While these known reinforcing mechanisms are successful to a degree, they suffer from several logistical problems. The threaded tie rod 2 shown in FIG. 1 is expensive to produce and deploy in a duct of any length. Similarly, the insert 12 shown in FIG. 2 is also prohibitively expensive.

With the forgoing problems and concerns in mind, it is the general object of the present invention to provide a duct reinforcing rod which overcomes the above-described drawbacks while maximizing effectiveness and flexibility in the assembling process.

SUMMARY OF THE INVENTION

It is an object of the present invention to provide a reinforcing rod for ducts.

It is another object of the present invention to provide a reinforcing rod for ducts which do not utilize expensive constituent elements.

It is another object of the present invention to provide a reinforcing rod for ducts which utilize commercially available components.

It is another object of the present invention to provide a reinforcing rod for ducts which utilizes a pair of crimps to secure a threaded bolt or nut against longitudinal movement therein.

It is another object of the present invention to provide a reinforcing rod for ducts which will significantly reduce the overall expense of outfitting ductwork with such reinforcing rods.

It is another object of the present invention to provide a reinforcing rod for ducts is both quick to manufacture, as well as being reliable in use.

It is another object of the present invention to provide a fabrication apparatus to fabricate the reinforcing rod.

These and other objectives of the present invention, and their preferred embodiments, shall become clear by consideration of the specification, claims and drawings taken as a whole.

DETAILED DESCRIPTION OF THE PREFERRED EMBODIMENT

Figure 3:
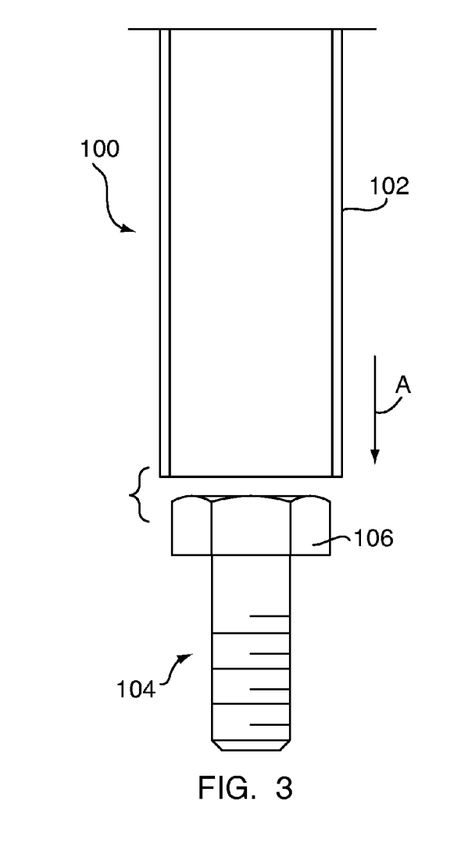
FIG. 3 is a cross-sectional view of a duct reinforcing rod utilizing a bolt element, according to one embodiment of the present invention

FIG. 3 is a cross-sectional view of a duct reinforcing rod 100, according to one embodiment of the present invention. As depicted in FIG. 3, the reinforcing rod 100 includes a metal tubing 102 and a standard bolt, or jam nut, 104. As illustrated in FIG. 3, the tubing 102 and the bolt 104 are sized so that the head 106 of the bolt 104 enjoys a fight fitting relationship with the inner diameter of the tubing 102 when the tubing 102 is pressed over the head 106 in the general direction of arrow A, as will be described in more detail later.

The tubing 102 is envisioned to be a common, commercially available metallic conduit, such as is utilized in electrical wiring, however the present invention is not limited in this regard as the tubing 102 may alternatively be formed from any elongated, rigid tubing without departing from the broader aspects of the present invention. Likewise, the bolt 104 is envisioned to be a common, commercially available metallic bolt, which itself may be formed from zinc, stainless steel or the like without departing from the broader aspects of the present invention. The utilization of a standard, commercially available threaded nut, in place of the threaded bolt 104 shown in FIGS. 3 and 4, is also contemplated by the present invention and will be described in more detail later in conjunction with FIG. 5.

It is therefore an important aspect of the present invention that the reinforcing rod 100 is constructed utilizing common, commercially available 'stock' components. By utilizing such components, the present invention significantly reduces the overall cost of manufacturing the reinforcing rod 100, as compared to prior art devices. Further, and as generally discussed previously, a typical duct system will employ a large number of periodically spaced reinforcing rods, therefore the aggregate savings realized by employing a reinforcing rod according to the present invention is oftentimes quite large.

Figure 4:
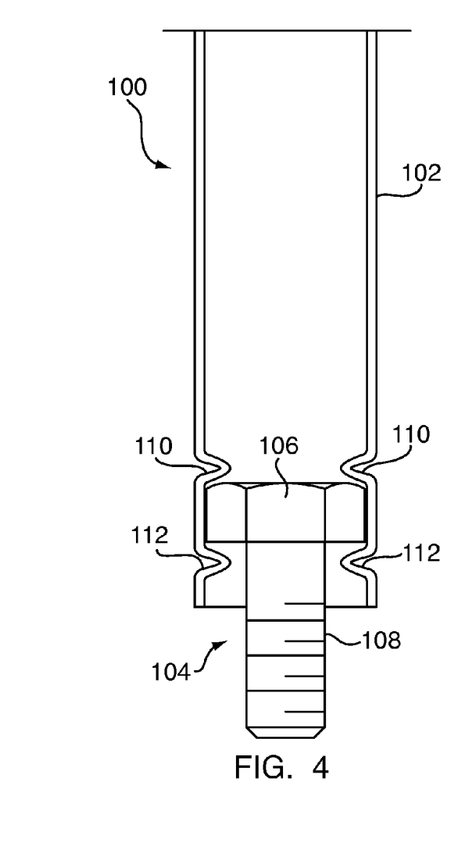
FIG. 4 is a cross-sectional view of the duct reinforcing rod shown in FIG. 3 after a crimping operation has been accomplished.

FIG. 4 illustrates the reinforcing rod 100 after the tubing 102 has been pressed over the head 106 of the bolt 104. As depicted in FIG. 4, the tubing 102 is pressed over the head 104 so as to extend beyond the head 104 a predetermined amount. Indeed, it will be readily appreciated that the length of the threaded section 108 of the bolt 104 which extends beyond the tubing 104 may be varied in accordance with the specific design characteristics of the ductwork and the relative length of the bolt 104 utilized.

The reinforcing rod 100 shown in FIG. 4 is crimped in a radially inward direction so as to capture the head 104 therebetween. In contrast to prior art devices, the present invention employs both first and second crimps, 110 and 112 respectively, disposed above and below the head 106 to ensure against longitudinal movement of the bolt 104 within the tubing 102.

Figure 5:
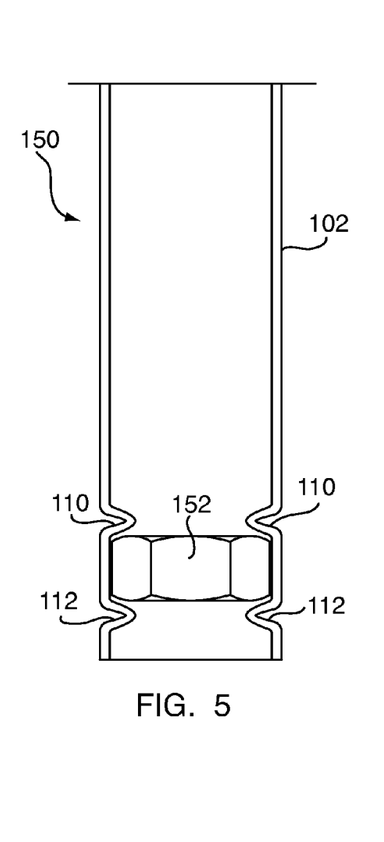
FIG. 5 is a cross-sectional view of the duct reinforcing rod utilizing a nut element after a crimping operation has been accomplished, according to another embodiment of the present invention.

FIG. 5 illustrates a reinforcing rod 150 utilizing a threaded nut 152 in place of the bolt 104 shown in FIGS. 3 and 4, according to another embodiment of the present invention. As depicted in FIG. 5, the tubing 102 is pressed over the nut 152 and the tubing 104 is then is crimped in a radially inward direction so as to capture the nut 152 therebetween. As discussed in conjunction with FIGS. 3 and 4, the present invention employs both first and second crimps, 110 and 112 respectively, disposed above and below the nut 152 to ensure against longitudinal movement of the nut 152 within the tubing 102.

It is therefore another important aspect of the present invention that the reinforcing rod 100/150 need not employ an inscribed, annual groove, or the like, in order to securely fix the bolt 104 or, alternatively, the nut 152, from longitudinal movement within the tubing 102.

Figure 6:
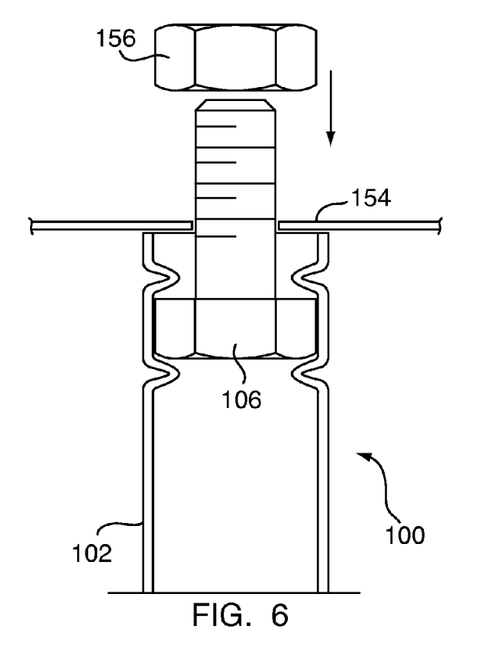
FIG. 6 illustrates the reinforcing rod of FIGS. 3 and 4 as it is employed in association with a duct wall, according to one embodiment of the present invention.
Figure 7:
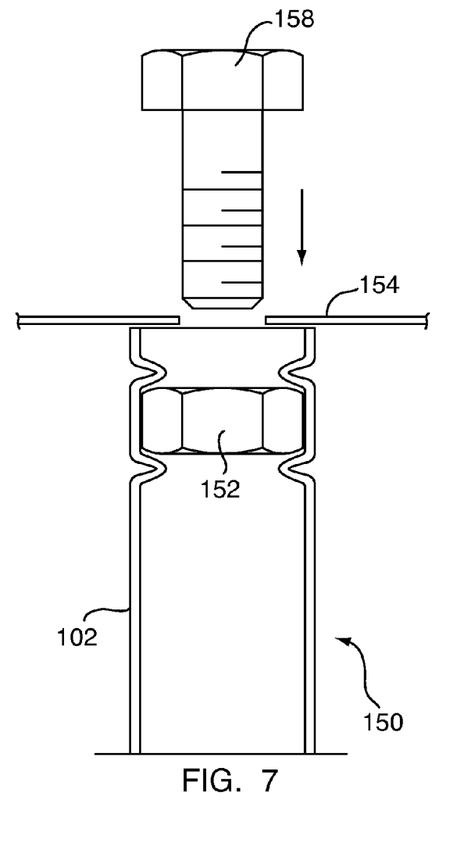
FIG. 7 illustrates the reinforcing rod of FIG. 5 as it is employed in association with a duct wall, according to another embodiment of the present invention.

FIG. 6 illustrates the reinforcing rod 100 as it is employed in association with a duct wall 154. As shown in FIG. 6, the reinforcing rod 100 is secured against the duct wall 154 via the application of a nut 156 having matching threads with the bolt 106 fixed within the tubing 102. Alternatively, FIG. 7 illustrates the reinforcing rod 150 as it is secured against the duct wall 154 via the application of a bolt 158 having matching threads with the nut 152 fixed within the tubing 102. Although not illustrated, the present invention also contemplates the use of rubber o-rings, washers, or the like, in conjunction with matching, threaded companions to the bolt 104 or the nut 152 to secure the reinforcing rod 100/150 to the planar sides of a duct. As will be appreciated, the rubber o-rings, washers, or the like may be utilized adjacent to the duct wall 154 in order to substantially attenuate or eliminate vibration of the duct wall 154 during air movement through the ductwork.

Figure 8:
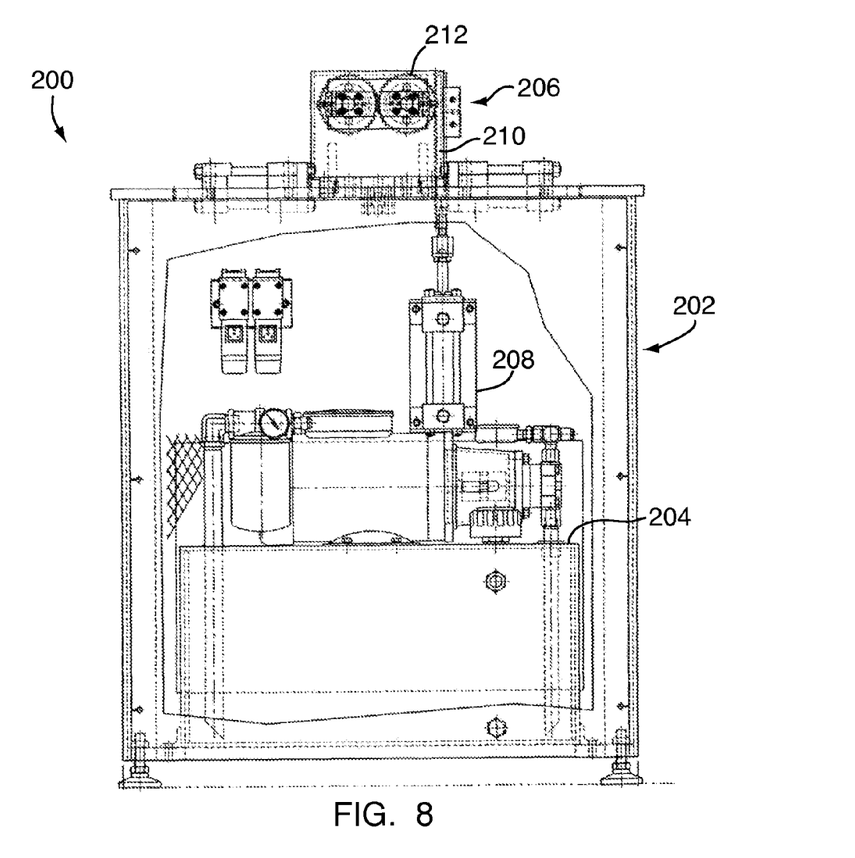
FIG. 8 illustrates a partial, cross-sectional side, planar view of a vertical fabrication apparatus, according to one embodiment of the present invention.

Reference will now be made to FIGS. 8-12 in order to more completely describe a fabrication apparatus of the reinforcing rod 100, according to one embodiment of the present invention. FIG. 8 illustrates a partial, cross-sectional side, planar view of a vertical fabrication apparatus 200, according to one embodiment of the present invention. As shown in FIG. 2, the vertical fabrication apparatus 200 generally includes a housing 202, a work surface 204 and a rack and pinion mechanism 206. The rack and pinion mechanism 206 further includes a tube pushing cylinder 208 which, when selectively actuated, serves to move the rack 210 in a vertical direction, thereby causing the pinions 212 to rotate accordingly. The movement of the pinions 212 cause the tube 102 to be pushed down over the head 106 of the bolt 102, as will be described in more detail later.

Figure 9:
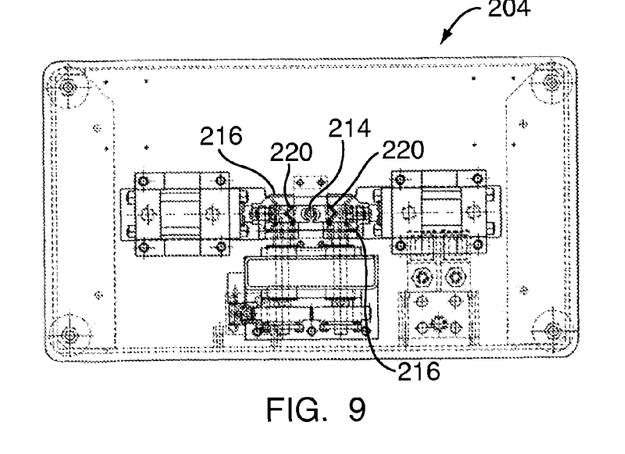
FIG. 9 illustrates a top, planar view of work surface of the vertical fabrication apparatus shown in FIG. 8.

A planar top view of the work surface 204 is depicted in FIG. 9 and illustrates an arresting depression 214 in which the bolt 104 is mounted to await the movement of the tubing 102 thereon. A matching pair of crimper slide blocks 216 are also shown in FIG. 9 and are selectively slidable towards one another in order to accomplish the formation of the crimps 110 and 112, shown in FIG. 4.

Figure 10:
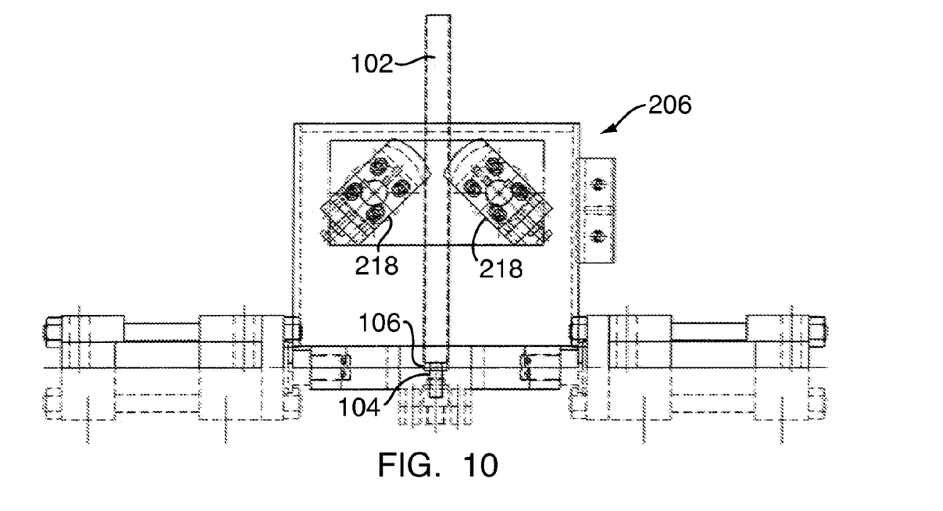
FIG. 10 is a partial cross-sectional view of the tubing of the reinforcing rod after it has been loaded into the vertical fabrication apparatus shown in FIG. 8.
Figure 11:
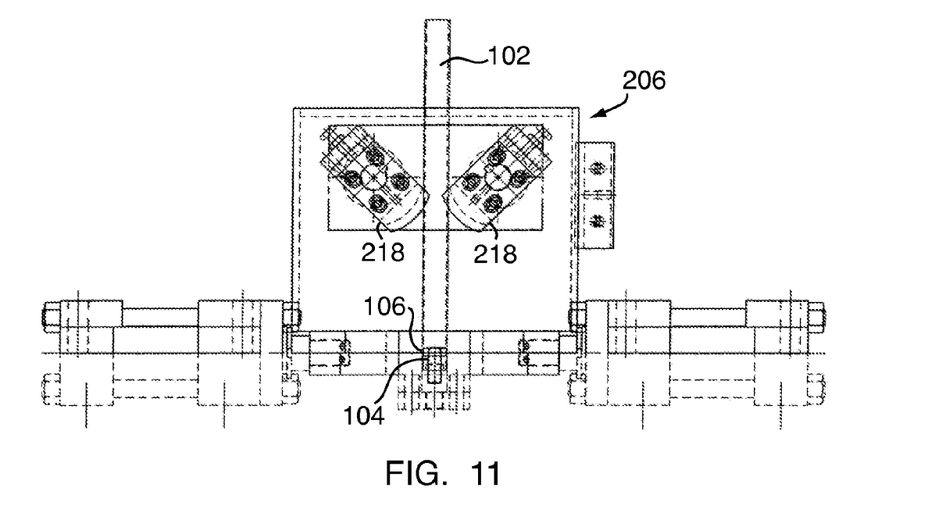
FIG. 11 is a partial cross-sectional view of the tubing of the reinforcing rod after it has been pushed down upon a bolt arrested in the vertical fabrication apparatus of FIG. 8.

In operation, the tubing 102 is mounted within the rack and pinion mechanism 206, as illustrated in FIG. 10. As further illustrated in FIG. 10, the bolt 104 is mounted in the arresting depression 214 directly under the loaded tubing 102. A pair of matching tube pushers 218 are disposed on either side of the loaded tubing 102 and operate under the biasing of the pinions 212 as a result of the actuation of the tube pushing cylinder 208. The tube pushers 218 are designed to force the tubing 102 in a downward, substantially vertical motion and over the head 106 of the bolt 104. FIG. 11 illustrates the position of the tube pushers 218 after the tubing 102 has been pushed over the head 106 of the bolt 104.

Figure 12:
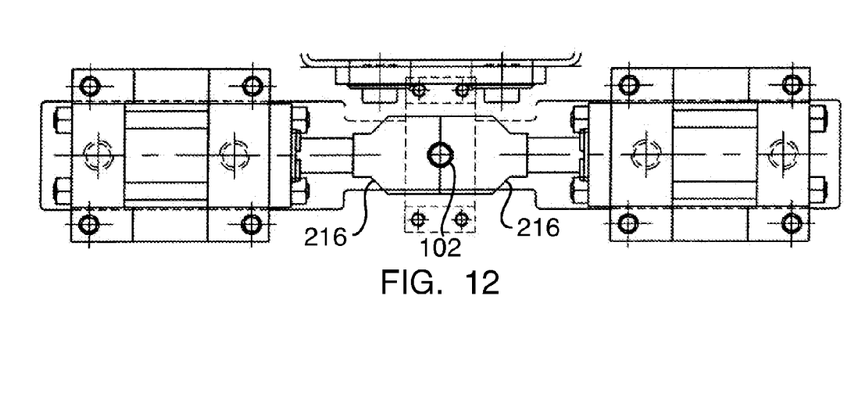
FIG. 12 illustrates the closed position of a pair of matching crimper slide blocks shown in FIG. 8.

Once the tubing has been pushed over the head 106 of the bolt 104, the pair of crimper slide blocks 216 are actuated and are brought to bear upon the exterior surface of the tubing 102, as illustrated in FIG. 12. As the crimper slide blocks 216 impinge upon the exterior surface of the tubing 102, a pair of angled crimpers 220, shown in FIG. 9, create the crimps 110 and 112 in the tubing 102. Thus, the head 106 of the bolt 104 is securely fixed between the crimps 110 and 112. At this juncture, the tube pushing cylinder 208 is selectively caused to reverse direction and the reinforcing rod 100 is lifted away from the work surface 204 to be subsequently removed. It will be readily appreciated that both ends of the tubing 102 will be deformed to fix a bolt in either end thereof.

The vertical fabrication apparatus 200 may be electrically, pneumatically or hydraulically operated, or a combination thereof. In the preferred embodiment of the present invention, the operation of the vertical fabrication apparatus 200 is pneumatically actuated.

While FIGS. 8-12 discuss the vertical fabrication apparatus 200, the present invention also contemplates orienting the operation of the fabrication apparatus in the horizontal plane. In this regard, FIG. 13 illustrates a partial cross-sectional view of a horizontal fabrication apparatus 300.

Figure 13:
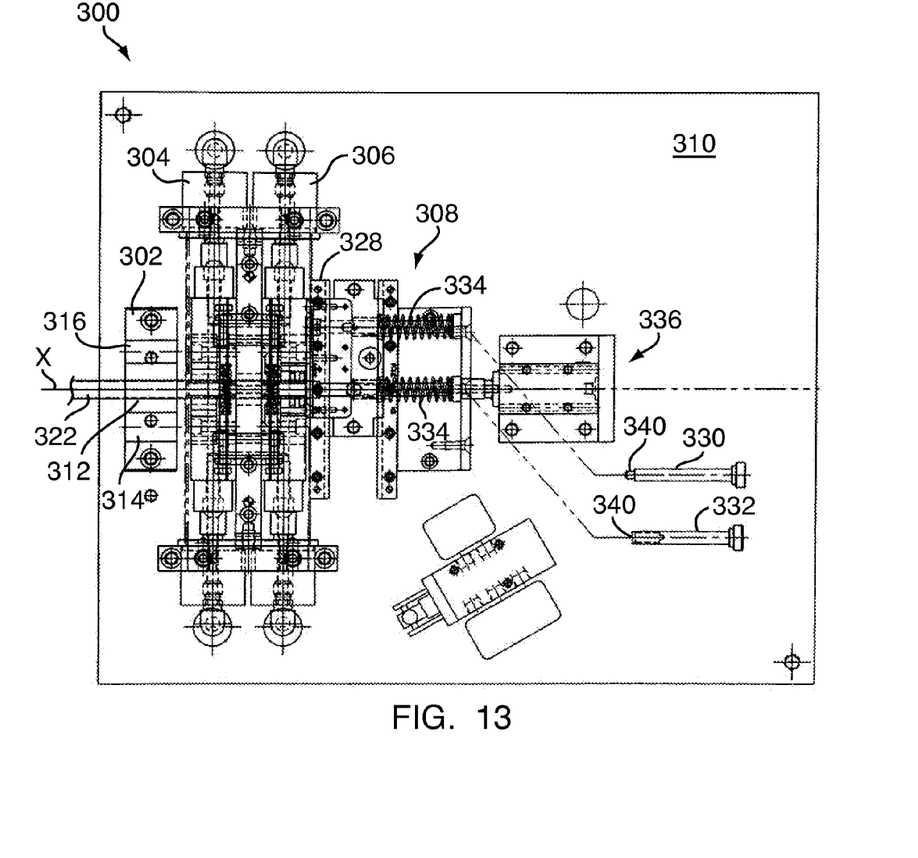
FIG. 13 illustrates a partial cross-sectional view of a horizontal fabrication apparatus, according to another embodiment of the present invention.

As shown in FIG. 13, the horizontal fabrication apparatus 300 includes a support base 302, a clamping station 304, a crimping station 306 and an insertion device 308. The clamping station 304 and the crimping station 306 each extend across the planar work surface 310 of the horizontal fabrication apparatus 300, substantially perpendicular to the insertion axis X of the horizontal fabrication apparatus 300.

The support base 302 is preferably a block of metal having a plurality of half-cylindrical depressions, 312, 314 and 316, formed on the upper side thereof. The depressions are sized to accommodate a conduit of differing diameters and is selectively translatable in the lateral direction, that is, in a direction substantially perpendicular to the insertion axis X, so as to selectively position one of the depressions opposite the tooling opening or aperture of the clamping station 304.

Figure 14:
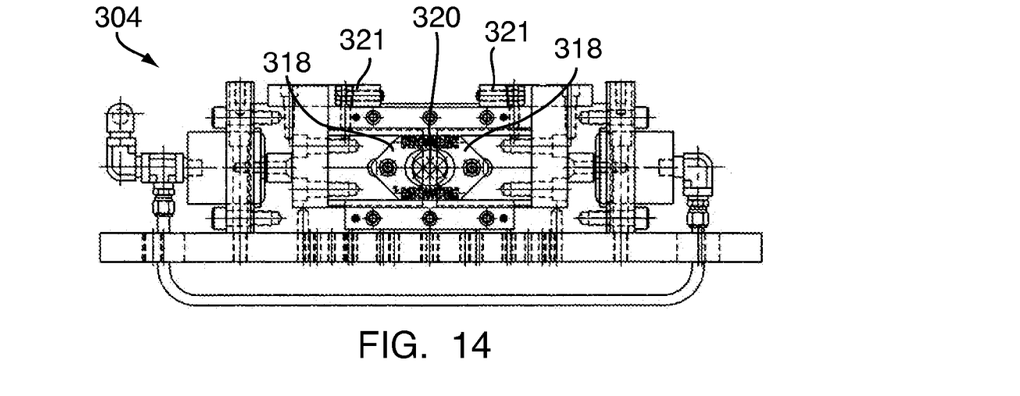
FIG. 14 illustrates a partial cross-sectional elevational view of a clamping station.
Figure 15:
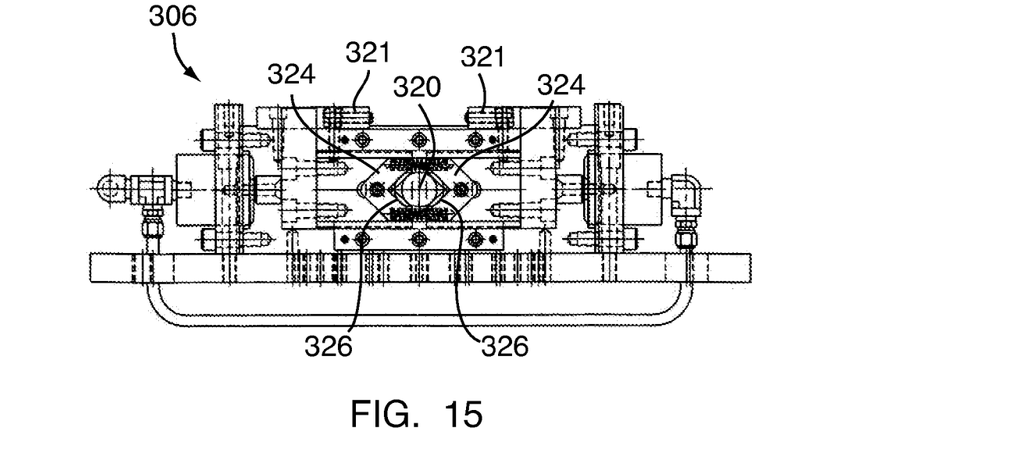
FIG. 15 illustrates partial cross-sectional elevational view of a crimping station.

FIGS. 14 and 15 illustrate partial cross-sectional elevational views of the clamping station 304 and the crimping station 306, respectively. As shown in FIG. 14, the clamping station includes a pair of pneumatically actuated clamping arms 318 disposed about the tooling aperture 320. It is the function of the clamping station 304 to securely hold the conduit 322 (seen in FIG. 13) in position, thereby preventing axial or transverse movement of the conduit 322 during the insertion and crimping process, to be discussed in more detail later.

The arms 318 of the clamping station 304 define an inner, substantially circular opening which act as the tooling aperture 320. As will be appreciated, the arms 318 may be interchanged so as to provide a tooling aperture of appropriate diameter to match the diameter of the particular conduit being utilized. Moreover, the shape of the inner, circular opening of the arms 318 are meant to arrest, as opposed to deform, the conduit 322.

Aligned with the clamping station 304, the crimping station 306 of FIG. 15 includes a pair of pneumatically actuated crimping arms 324 disposed about the tooling aperture 320. It is the function of the crimping station 306 to produce the crimps, 110 and 112, that hold the bolt or nut within the conduit 322, as discussed previously in conjunction with FIGS. 4 and 5. Indeed, in order to form both sets of crimps, 110 and 112, in a single operation, the crimping station 306 is preferably provided with two pairs of crimping arms 324, disposed one behind the other as viewed in FIG. 15.

The arms 324 of the crimping station 306 define inwardly protruding, lateral impact edges 326 which are co-axially aligned with the tooling aperture 320. The inwardly protruding, lateral impact edges 326 serve to impact and deform the conduit 322, thereby producing the crimps 110 and 112 when the arms 324 move towards one another. As will be appreciated, the arms 324 may be interchanged so as to accommodate the diameter of the particular conduit being utilized. Moreover, the arms 324 may also be interchanged, as necessary, to address wear of the inwardly protruding, lateral impact edges 326.

As best seen in FIGS. 14 and 15, the clamping station 304 and the crimping station 306 each include matching pairs of stop adjustment bolts 321. The stop adjustment bolts 321 are utilized so as to adjust the amount by which the clamping arms 318 and the crimping arms 324 travel towards one another, and may thereby adjust the fixing pressure of the clamping arms 318 and the impact pressure of the crimping arms 324.

Taking FIGS. 13-15 in combination, the conduit 322 is first situated within one of the depressions, 312, 314 and 316, the appropriate one of which has previously been oriented co-axially with the tooling aperture 320. The conduit 322 is then inserted through the tooling aperture 320 of both the clamping station 304 and the crimping station 306 until its distal end is properly located by a block 328, seen in FIG. 13. The clamping station 304 is then actuated to cause the arms 318 to move against and fix the conduit 322 during the insertion of the bolt 108 or nut 152 into the conduit 322, and the subsequent crimping action.

Returning to FIG. 13, the insertion device 308 includes a nut insertion punch 330 and a bolt insertion punch 332. The nut insertion punch 330 and the bolt insertion punch 332 are selectively actuatable by a pneumatically operated solenoid 336. The solenoid 336 is itself may be selectively translatable in a direction substantially perpendicular to the insertion axis X so as to selectively position the operable end of the solenoid 336 opposite either the nut insertion punch 330 or the bolt insertion punch 332. In a preferred embodiment of the present invention, however, the solenoid 336 is maintained in a stationary position, while the nut insertion punch 330 and the bolt insertion punch 332 are selectively translatable for actuation by the solenoid 336.

One a bolt 108 or nut 152 has been properly loaded in opposition to an impact end 340 of the nut insertion punch 330 or the bolt insertion punch 332, as will be discussed in greater detail later, actuation of the horizontal fabrication apparatus 300 will selectively cause the solenoid 336 to push against the nut insertion punch 330, or the bolt insertion punch 332, and the integral biasing springs 334, thereby urging the bolt 108 or nut 152 into the secured conduit 332 in the direction of insertion axis X. As will be appreciated, the solenoid 336 serves to urge the bolt 108, or nut 152, into the conduit 322 by an amount which properly positions the bolt 108, or nut 152, to accept crimping on either side thereof, as illustrated in FIGS. 4 and 5.

Figure 16:
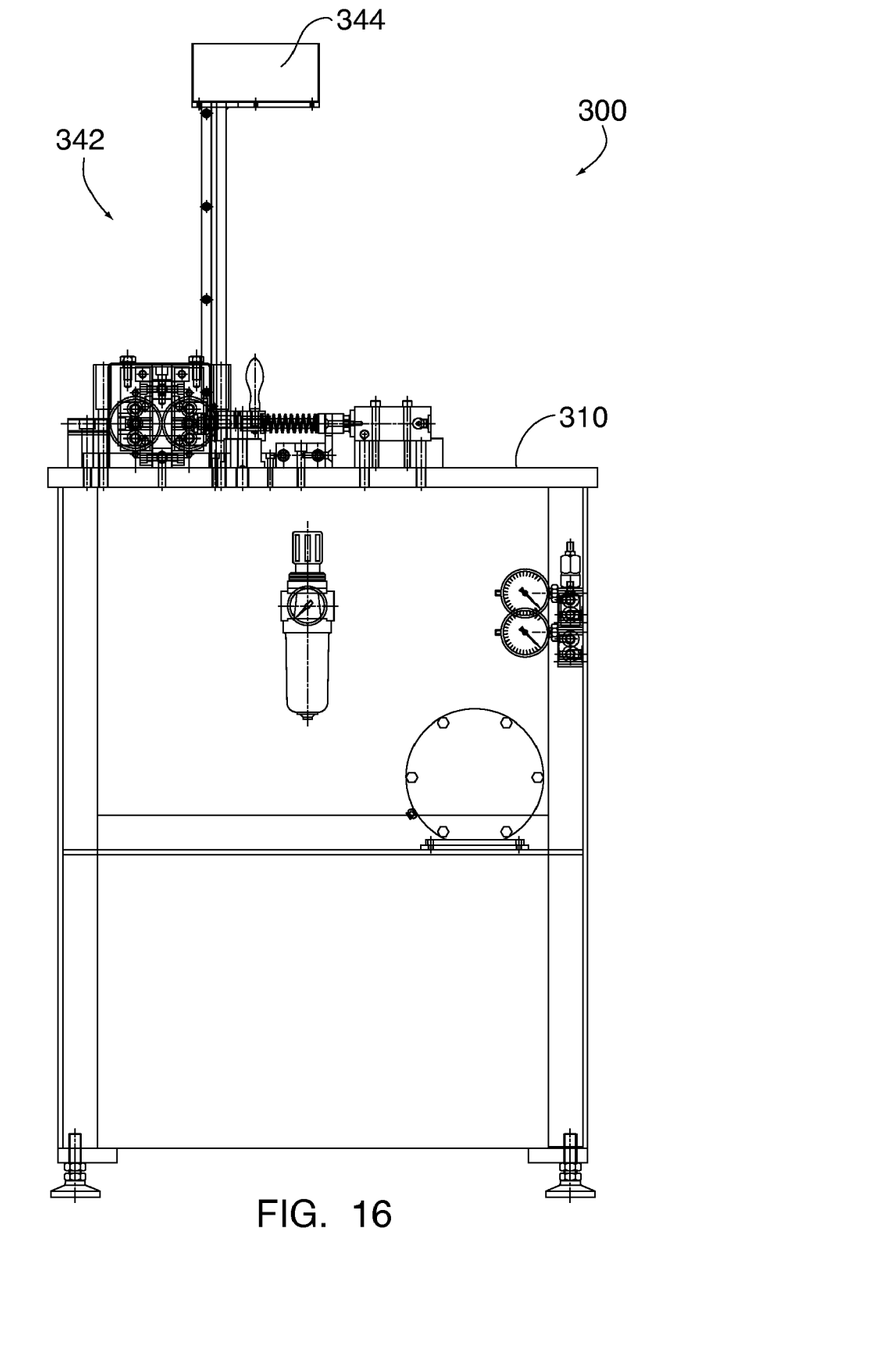
FIG. 16 illustrates a side elevation of the horizontal fabrication apparatus of FIG. 13.
Figure 17:
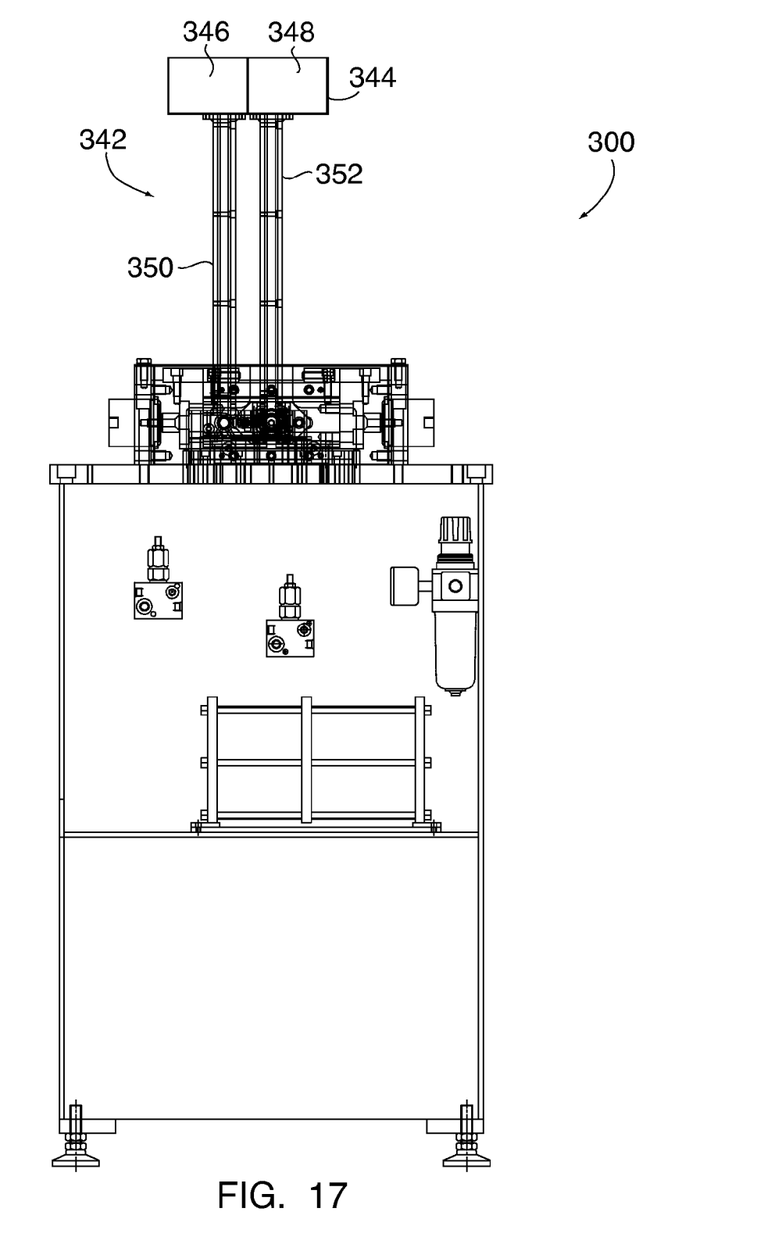
FIG. 17 illustrates a front elevation of the horizontal fabrication apparatus of FIG. 13.

The horizontal fabrication apparatus 300 of the present invention also selectively provides for the automatic feeding of the requisite bolts 108, or nuts 152, via a gravity feed device 342. FIGS. 16 and 17 show side and frontal elevations of the horizontal fabrication apparatus 300, respectively, as equipped with the gravity feed device 342. As shown in FIGS. 16 and 17, the gravity feed device 342 includes an elevated hopper 344 having two compartments, 346 and 348, for separately storing the bolts 108 and the nuts 152.

Figure 18:
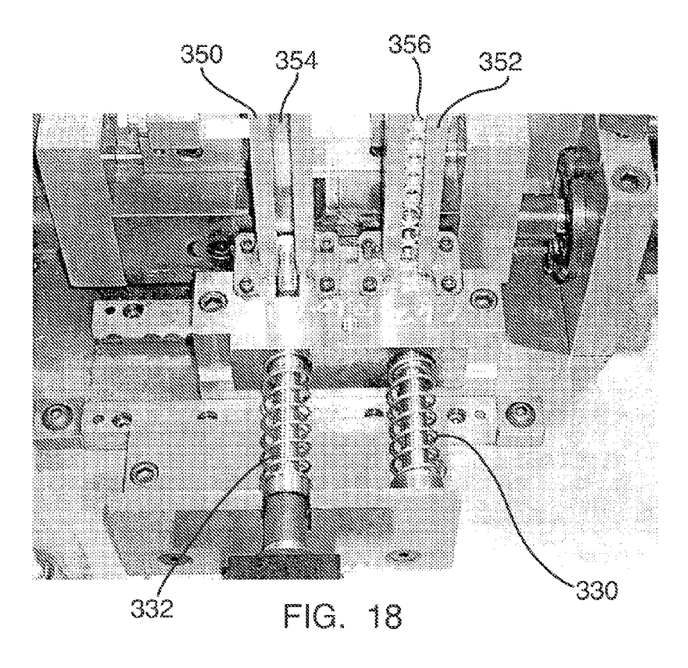
FIG. 18 illustrates the two separate feeding tracks used to supply the insertion elements for the horizontal fabrication apparatus of FIG. 13.

As best seen in FIG. 17, the gravity feed device 342 preferably includes two separate feeding tracks, 350 and 352, which hold a plurality of bolts 108 and nuts 152 therein. FIG. 18 illustrates the two separate feeding tracks, 350 and 352, as well as their respective tracks, 354 and 356, and shows how the bolt 108 and the nuts 152 are selectively positioned for insertion by the nut insertion punch 330, or the bolt insertion punch 332.

It will be readily appreciated that after the conduit 322 has been secured by the clamping station 304, and the bolt 108 or nut 152 has been inserted therein via the gravity feed device 342 and the solenoid 336, the crimping station will imprint the crimps 110 and 112 to the conduit 322 to securely fix the bolt 108, or nut 152, within the conduit 322. All tooling of the horizontal fabrication apparatus 300 will subsequently retract for easy removal of the conduit 322, which may then be processed in a similar fashion on its opposing distal end, forming the finished reinforcing rod 100 of the present invention.

As will be appreciated by consideration of the embodiments illustrated in FIGS. 1-18, the present invention provides a reinforcing rod for ducts which utilize standardized components to form a rigid and economical stabilizer. Moreover, the formation of a pair of first and second crimps to securely fix a standard bolt there between, including an fabrication apparatus for accomplishing this crimping, provides a heretofore unknown securing configuration which is both quick to manufacture, as well as being reliable in use. By employing the vertical fabrication apparatus 200, or the horizontal fabrication apparatus 300, to form the reinforcing rod 100, the present invention significantly reduces the time, labor and expense of preparing stabilization and reinforcing rods for use in commercial and residential ductwork.

While the invention has been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all equivalent embodiments.

What is claimed is:

1. An apparatus for fabricating duct reinforcing rods, said apparatus comprising:
   a rack-and-pinion mechanism;
   a pair of tube pushers disposed on either side of a length of conduit, said tube pushers being driven by the rack-and-pinion mechanism to force the length of conduit in a substantially vertical motion over a threaded element, for positioning the threaded element inside the length of conduit; and
   a pair of crimper slide blocks each having at least one angled crimper, wherein the crimper slide blocks are brought to bear upon the exterior surface of the conduit, after the threaded element is positioned inside the length of conduit, for said angled crimpers to create deformations in the conduit on either side of said threaded element, thereby fixing the threaded element in place inside the length of conduit.

* * * * *